United States Patent [19]
Tanaka et al.

[11] Patent Number: 5,238,286
[45] Date of Patent: Aug. 24, 1993

[54] INSTRUMENT PANEL STRUCTURE FOR AN AUTOMOTIVE VEHICLE

[75] Inventors: Matsuhiro Tanaka; Hiroyuki Tamagawa, both of Hiroshima, Japan

[73] Assignee: Mazda Motor Corporation, Hiroshima, Japan

[21] Appl. No.: 886,283

[22] Filed: May 21, 1992

[30] Foreign Application Priority Data

May 24, 1991 [JP] Japan .............................. 3-037218[U]

[51] Int. Cl.⁵ ................................................ B62D 1/18
[52] U.S. Cl. ...................................... 296/70; 296/189; 296/194; 74/492; 280/752; 280/779
[58] Field of Search .................. 296/70, 188, 189, 194; 74/492; 280/750, 752, 777, 779; 52/724

[56] References Cited

U.S. PATENT DOCUMENTS

| | | | |
|---|---|---|---|
| 4,671,536 | 6/1987 | Yoshimura | 280/779 |
| 4,709,943 | 12/1987 | Yoshimura et al. | 280/751 |
| 4,738,469 | 4/1988 | Ushijima et al. | 280/777 |
| 4,886,295 | 12/1989 | Browne | 280/777 |
| 4,895,390 | 1/1990 | Fujikawa et al. | 280/777 |
| 5,037,130 | 8/1991 | Okayama | 296/70 |

FOREIGN PATENT DOCUMENTS 2-92359  7/1990  Japan .

*Primary Examiner*—Robert R. Song
*Attorney, Agent, or Firm*—Keck, Mahin & Cate

[57] ABSTRACT

An instrument panel structure includes a transversely extending support member to which a steering apparatus, a knee protector, or both a steering apparatus and a knee protector are attached for relieving a shock load applied to the knees of a driver upon a collision of an automotive vehicle. The instrument panel structure is provided with a reinforcement or retainer for rigidly reinforcing the support member so as to prevent upward deformation of the support member during a collision.

22 Claims, 3 Drawing Sheets

INSTRUMENT PANEL STRUCTURE FOR AN AUTOMOTIVE VEHICLE

BACKGROUND OF THE INVENTION

1. Field of the Invention

This invention relates to an instrument panel structure of an automotive vehicle body. More particularly, the invention relates to an instrument panel structure having a mechanism for preventing deformation of a support member of the instrument panel structure during a collision and which adequately supports elements such as a steering apparatus or a knee protector during a collision.

2. Description of Related Art

Typically, instrument panel structures of a front body of an automotive vehicle include a support member, extending in a transverse direction of the front body, for supporting a steering apparatus, a knee protector for relieving a shock applied to a driver's knees upon a collision, etc. Such an instrument panel structure is known from, for instance, Japanese Unexamined Utility Model Publication No. 2-92,359.

For the purpose of providing a better understanding of such an instrument panel structure, reference is made to FIG. 4. As shown, an instrument panel structure has a support member 1, in a form of an elongated pipe, which extends in a transverse direction of a front body and supports a steering apparatus 3 and a knee protector 5. If the driver M is thrown forward upon the occurrence of a collision of the automotive vehicle, the knee protector 5 will be hit by the driver's knees N, as shown by a chained line. Simultaneously, a steering wheel 8 of the steering apparatus 3 will be loaded by the upper body of the driver. As a result, the support member 1 is subjected to a thrust-up force exerted on the knee protector 5 by the knees N and a "swing force" or torque applied by the steering apparatus 3, and specifically a steering column 6 thereof, when the steering apparatus 3 swings or turns forward around its supported distal end due to the impact load applied to the steering wheel 8 by the driver's upper body. The support member 1, therefore, may possibly be deformed upward in a direction indicated by an arrow P. Such forward movement of the steering apparatus 3 is enhanced if an air bag is assembled in the steering apparatus 3. Deformation of the support member of the instrument panel structure described in the Japanese publication may cause a decline in structural resistance of the automotive vehicle body against collisions.

In order to absorb or suppress shock energy acting on a steering wheel during a collision, it is typical to instal a collapsible steering column having a dual-pipe structure in the steering apparatus. However, if upward deformation of the support member displaces the steering wheel forward and the driver's upper body hits the steering wheel in a direction which is different from an axial direction of the steering column or a direction in which the steering column is intended to collapse, the steering column will not properly collapse and absorb shock energy applied to the steering wheel.

SUMMARY OF THE INVENTION

It is an object of the present invention to provide an instrument panel structure for the front body of an automotive vehicle in which a support member for supporting a steering apparatus is prevented from upward deformation when a collision of the automotive vehicle occurs.

The forgoing object of the present invention is accomplished by providing an instrument panel structure of a front body of an automotive vehicle which has a support member, such as a hollow pipe, for supporting a steering apparatus. The support member extends substantially parallel to a floor panel member in a transverse direction of the front body and is fixedly secured at its opposite ends to front side members which extend upward from and at opposite sides of the floor panel member. The instrument panel structure is provided with knee protecting means secured to the support member at a position within a half portion of the hollow pipe support member by which the steering apparatus is supported. The knee protecting means deforms when it is hit a by driver's knees upon a collision of the automotive vehicle so as to relieve an impact load applied to the driver's knees. A reinforcing pipe member is closely fitted in the support member, which structurally reinforces at least a half portion of the hollow pipe support member by which the steering apparatus is supported so as to restrict deformation of the hollow pipe support member caused by forward swinging movement of the steering apparatus due to a collision of the automotive vehicle.

The support member is rigidly connected to the floor panel member by means of a reinforcing strut member. The reinforcing strut member thrusts the support member downward so as to restrict deformation of the support member caused through the knee protecting means when the knee protecting means is hit by the driver's knees.

The instrument panel structure does not always need both the reinforcing pipe member and the reinforcing strut member. However, it is essential to provide the instrument panel structure with at least one of the reinforcing pipe member and the reinforcing strut member.

BRIEF DESCRIPTION OF THE DRAWINGS

The above and other objects and features of the present invention will be apparent to those skilled in the art from the following description of a preferred embodiment thereof when considered in conjunction with the appended drawings, in which.

DETAILED DESCRIPTION OF THE PREFERRED EMBODIMENT

Because instrument panel structures of automotive vehicles are well known, the present description will be directed in particular to elements forming part of, or cooperating directly with, an apparatus in accordance with the present invention. It is to be understood that elements not specifically shown or described can take various forms well known to those skilled in the automobile art.

Figure 1:
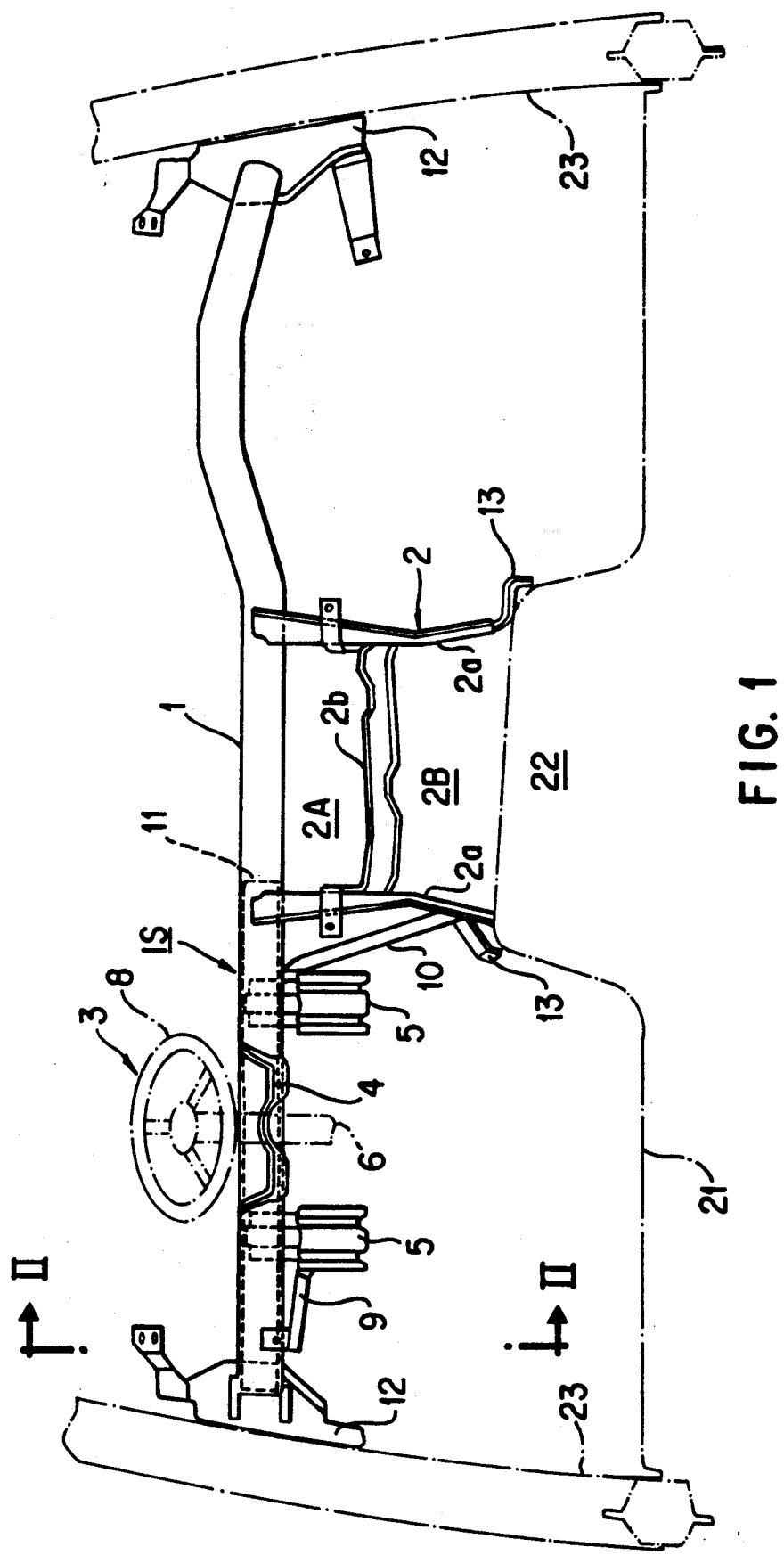
FIG. 1 is a front view showing an essential part of an instrument panel structure of the front body portion of an automotive vehicle in accordance with a preferred embodiment of the present invention.
Figure 2:
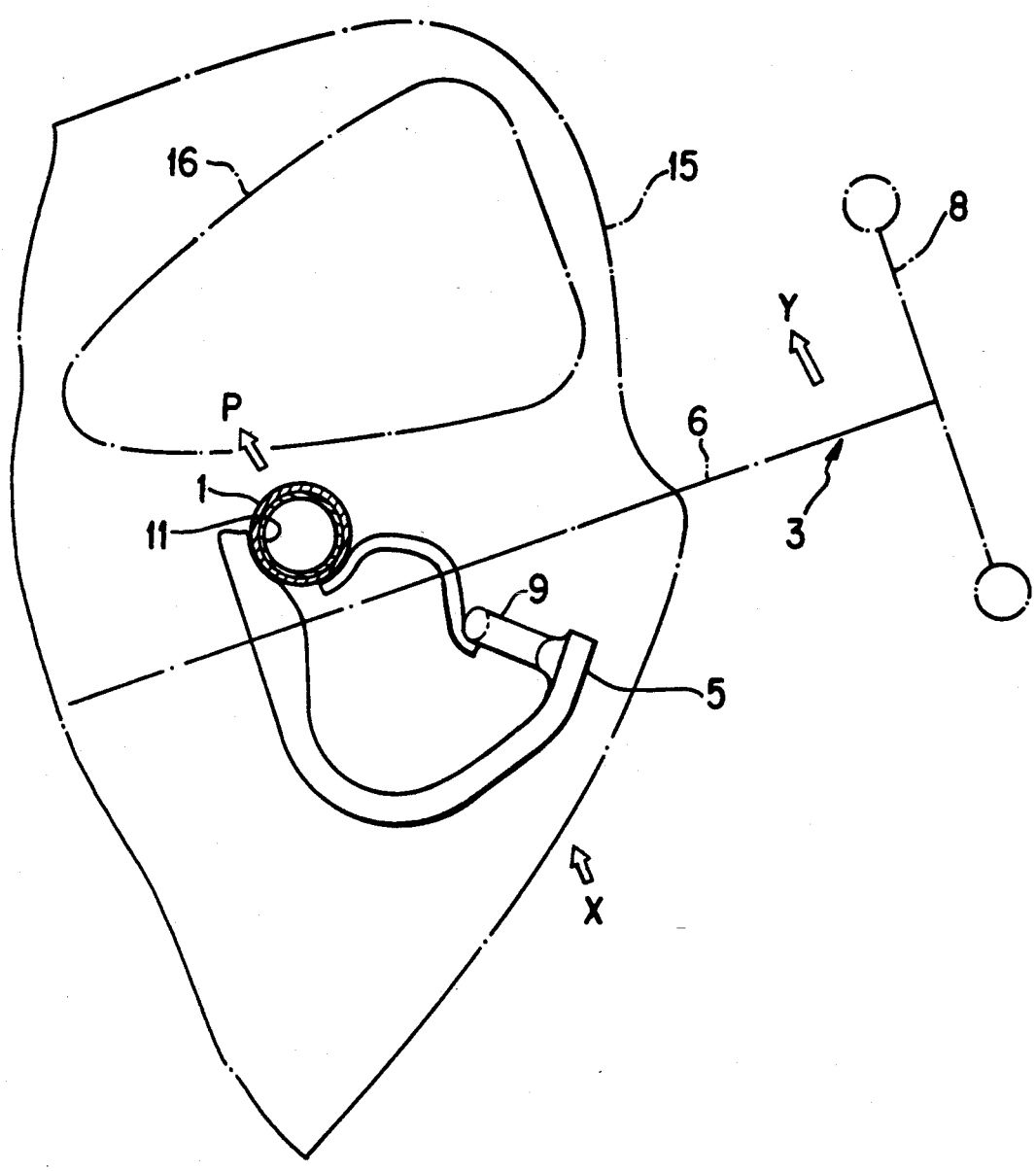
FIG. 2 is a partial sectional view of FIG. 1 as seen along line II—II.

Referring to the drawings in detail and, in particular, to FIGS. 1 and 2, an instrument panel structure of an automotive vehicle body in accordance with a preferred embodiment of the present invention is shown. An instrument panel structure IS includes a support member or beam 1, made of a hollow pipe, which extends in a transverse direction of the front body, and is secured at its opposite ends to lower portions of front side pillars 23, located at opposite sides of the front body, by means of support beam brackets 12, respectively. The support beam 1 has a stay assembly 2 welded or otherwise secured to the middle portion thereof. The support beam 1 is connected by the stay assembly to a floor panel member 21 of the vehicle body at a position at which a propeller shaft tunnel 22 is formed. The stay assembly 2 comprises a pair of generally triangularly-shaped stay side plates 2a, extending downward from the support beam 1 and juxtaposed at a predetermined distance in the transverse direction, and a strut 2b interconnecting the middle portions of the stay side plates 2a so as to divide a space defined by and between the stay side plates 2a into two, namely, an upper space 2A and a lower space 2B, in which audio-instruments are disposed. Each stay side plate 2a is welded or otherwise secured at its upper end to the support beam 1 and is attached at its lower end with a connecting piece 13 through which the stay assembly 2 is connected to the propeller shaft tunnel of, the floor panel member. The support beam 1 further has a steering or column bracket 4 for holding a steering apparatus 3. Knee protectors 5 are placed on opposite sides of the steering bracket 4 for relieving an impact load applied to knees of the driver upon a collision. Both of the knee protectors 5 are welded or otherwise secured to the driver's side portion of the support beam 1.

Each knee protector 5 is generally U-shaped and elastically deformable so that it operates in such a way that when it is hit by the driver's knees upon a collision, it elastically deforms so as to absorb or relieve shock load applied thereto by the driver's knees. One of the knee protectors 5, placed between the steering bracket 4 and the support beam bracket 12, is welded or otherwise secured at its one end to the support beam 1, and is connected at its free end to the support beam 1 through a stay arm 9. The other knee protector 5, placed between the steering bracket 4 and the stay assembly 2, is welded or otherwise secured at its one end to the support beam 1. Its other end, however, is left free.

The stay side plate 2a, placed close to the steering apparatus 3, is connected at its lower portion to the support beam 1 by means of a link lever or rigid strut 10 so as to give a thrust-down force to the support beam 1. For sufficient structural stiffness, the link lever 10 is welded at one end to the support beam 1 by a butt weld. The link lever is also welded and bolted firmly at its other end to the lower end portion of the stay side plate 2a.

Support beam 1 is fixedly provided with a hollow, internal reinforming pipe 11 closely fitted therein so as to increase its structural stiffness along roughly the half portion thereof where the steering apparatus 3 and the knee protectors 5 are supported. The reinforcing pipe 11 is welded to the support beam 1 entirely around the circumference of its ends and is also plug-welded to the support beam 1 at a halfway portion. Welding the reinforcing pipe 11 to the support beam 1 in such a way increases considerably the structural stiffness of the support beam 1. An air bag unit 16 is installed behind an instrument panel 15.

Figure 3:
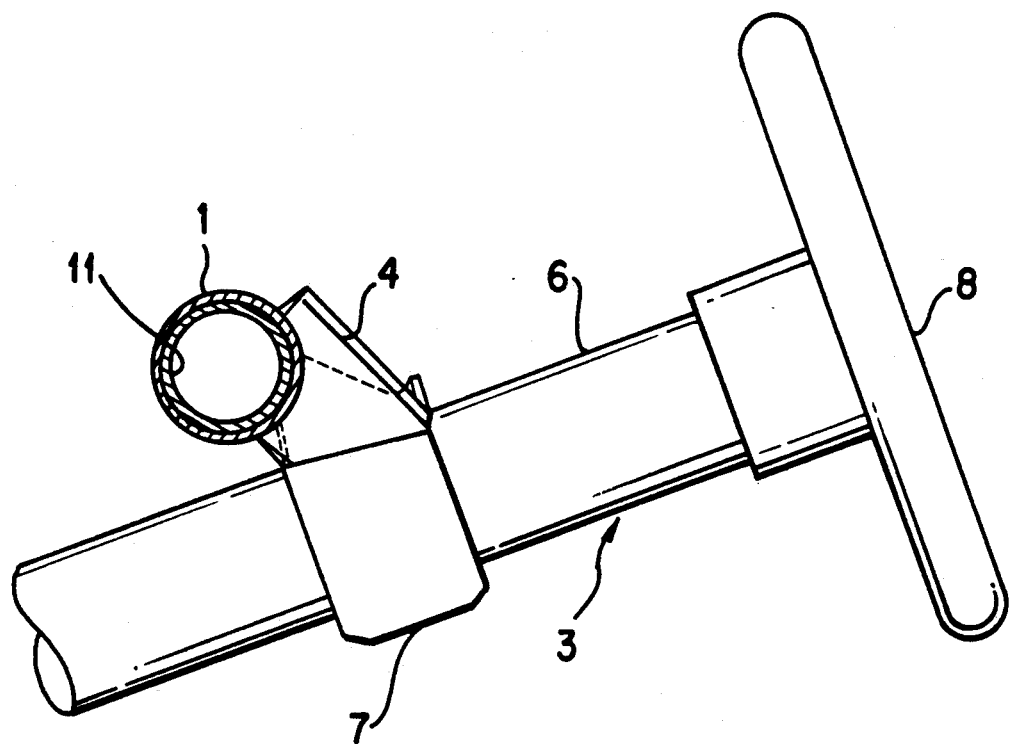
FIG. 3 is a side view showing a steering apparatus installed in the instrument panel structure of FIG. 1.
Figure 4:
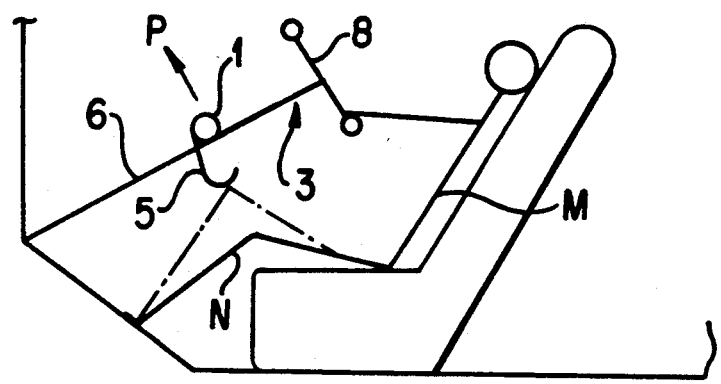
FIG. 4, as noted above, is an illustration showing a conventional instrument panel structure during a collision of an automotive vehicle.

Referring to FIG. 3, a collapsible steering column 6, forming part of the steering apparatus 3, is fastened to the column bracket 4 by means of a column fastener ring 7. The steering apparatus 3 includes a steering wheel 8 fastened to an upper end of the steering column 6. This steering column 6 has a dual-pipe collapsible structure which may be of any well known type.

As was described with respect the prior art instrument panel structure, if the driver is thrown forward from the seat during a collision of the automotive vehicle, the driver's knees hit the knee protectors 5 and the driver's upper body is forced against the steering wheel 8 of the steering apparatus 3. As a result, the support beam 1 is subjected to a thrust-up force exerted on the knee protector 5 in a direction indicated by an arrow X in FIG. 2 by the knees of the driver. The support beam 1 is also subjected to a swing force of the steering apparatus 3, specifically a steering column 6, when the steering apparatus 3 swings or turns forward, namely, in a direction indicated by an arrow Y in FIG. 2, due to the impact load applied to the steering wheel 8 by the driver's upper body. These forces may possibly cause upward support beam deformation in a direction indicated by an arrow P in FIG. 2.

However, the support beam 1 of the instrument panel structure shown in FIGS. 1 through 3 is free from such upward deformation because it is subjected to a thrust-down force through the link lever 10 firmly secured to and between the support beam 1 and the stay assembly 2 and because it is structurally reinforced, in stiffness, by the internal reinforcing pipe 11. This results in an improved structural performance of the automotive vehicle body against collisions and ensures that the collapsible steering apparatus will collapse during a collision as intended.

In order for the support beam 1 to be free from upward deformation, it is not necessary always to install both the link lever 10 and the internal reinforcing pipe 11 in the instrument panel structure. It is essential, however, to install at least one of the link lever 10 and the internal reinforcing pipe 1 in the instrument panel structure.

Although the above description has been directed to an instrument panel structure in which a steering apparatus and a knee protector are supported by a support beam, an instrument panel structure may be provided in which either a steering apparatus or a knee protector only is supported by a support beam.

It is to be understood that although the present invention has been described in detail with respect to a preferred embodiment thereof, various other embodiments and variants may occur to those skilled in the art. Any such other embodiments and variants which fall within the scope and spirit of the invention are intended to be covered by the following claims.

What is claimed is:

1. An instrument panel structure of a front body of an automotive vehicle for supporting a steering apparatus, said front body including a floor panel member and front side members extending upward from and at opposite sides of said floor panel member, said instrument panel structure comprising:

a support member extending substantially parallel to said floor panel member in a transverse direction of said front body and fixedly secured at its opposite ends to said front side members, said support member supporting said steering apparatus at a position to one side of a center of said support member; and reinforcing means for restricting deformation of said support member caused by forward swinging movement of said steering apparatus due to a collision of said automotive vehicle, said reinforcing means including a reinforcing pipe member closely fitted in the one side of the center of said support member.

2. An instrument panel structure as recited in claim 1, wherein said reinforcing means comprises a rigid strut for rigidly connecting said support member to said floor panel member so as to thrust said support member downward for restricting deformation of said support member caused by forward swinging movement of said steering apparatus due to a collision of said automotive vehicle.

3. An instrument panel structure as recited in claim 2, wherein said rigid strut is secured at one end to said support member at an inner position closer to another side of the center of said support member than said steering apparatus and at another end to said floor panel member.

4. An instrument panel structure as recited in claim 3, and further comprising knee protecting means secured to said support member at a position to the one side of said center of said support member for relieving an impact load applied to knees of the driver upon a collision.

5. An instrument panel structure as recited in claim 4, wherein said knee protecting means comprises a pair of elastically deformable members disposed on opposite sides of said steering apparatus, each elastically deformable member deforming when it is hit by knees of the driver so as to relieve an impact load applied to the knees of the driver upon a collision.

6. An instrument panel structure as recited in claim 5, wherein said support member comprises a hollow pipe.

7. An instrument panel structure as recited in claim 6, wherein said reinforcing pipe member is round-welded at one of its ends to an end of said hollow pipe support member and is plug-welded midway thereof to said hollow pipe.

8. An instrument panel structure as recited in claim 2, and further comprising stay means, disposed between said support member and said floor panel ember, for forming a space in which instruments are installed 9. An instrument panel structure as recited in claim 8, wherein said stay means comprises a pair of side stay plates, each of which is rigidly secured between said support member and said floor panel member and at least one of which is secured at one end to said one side of the center of said support member.

10. An instrument panel structure as recited in claim 9, wherein said rigid strut is welded at one end to said support member and welded and bolted at another end to one of said side stay plates so as to rigidly connect said support member to said floor panel member.

11. An instrument panel structure as recited in claim 1, wherein said steering apparatus comprises a collapsible steering column.

12. An instrument panel structure of a front body of an automotive vehicle for supporting a steering apparatus, said front body including a floor panel member and front side members extending from and at opposite sides of said floor panel member, said instrument panel structure comprising:

a hollow pipe support member, extending substantially parallel to said floor panel member in a transverse direction of said front body and fixedly secured at its opposite ends to said front side members, said support member supporting said steering apparatus at a position to one side of a center of said support member; and a reinforcing pipe member closely fitted in at least a half portion of said hollow pipe support member, said steering apparatus being supported by said half portion so as to restrict deformation of said hollow pipe support member caused by forward swinging movement of said steering apparatus due to a collision of said automotive vehicle.

13. An instrument panel structure as recited in claim 12, and further comprising knee protecting means, secured to said support member at a position within said half portion of said support member, for relieving an impact load applied to knees of a driver upon a collision.

14. An instrument panel structure as recited in claim 13, wherein said knee protecting means comprises a pair of elastically deformable members disposed on opposite sides of said steering apparatus, each elastically deformable member deforming when it is hit by a knee of the driver so as to relieve an impact load applied to the knee of the driver upon a collision.

15. An instrument panel structure as recited in claim 14, wherein said reinforcing pipe member is round-welded at an end thereof to an end of said hollow pipe support member and is plug-welded midway thereof to said hollow pipe support member.

16. An instrument panel structure as recited in claim 12, and further comprising a reinforcing rigid strut for rigidly connecting said hollow pipe support member to said floor panel member so as to thrust said hollow pipe support member downward, thereby restricting deformation of said hollow pipe support member caused by forward swinging movement of said steering apparatus due to a collision of said automotive vehicle.

17. An instrument panel structure as recited in claim 16, wherein said rigid strut is secured at one end to said hollow pipe support member at an inner position close to another half portion of said hollow pipe support member with respect to said steering apparatus and at its other end to said floor panel member.

18. An instrument panel structure as recited in claim 17, and further comprising stay means, disposed between said hollow pipe support member and said floor panel member, for forming a space in which instruments are installed.

19. An instrument panel structure as recited in claim 18, wherein said stay means comprises a pair of side stay plates, each of which is rigidly secured between said hollow pipe support member and said floor panel member and at least one of which is secured at its one end to said half portion of said ho low pipe support member.

20. An instrument panel structure as recited in claim 19, wherein said rigid strut is welded at one end to said hollow pipe support member and welded and bolted at another end to at least one side stay plate so as to rigidly connect said hollow pipe support member to said floor panel member.

21. An instrument panel structure as recited in claim 12, wherein said steering apparatus comprises a collapsible steering column.

22. An instrument panel structure of a front body of an automotive vehicle having a hollow pipe supporting member for supporting a steering apparatus, said supporting member extending substantially parallel to a floor panel member in a transverse direction of said front body and fixedly secured a its opposite ends to front side members which extend upward from and at opposite sides of said floor panel member, said instrument panel structure comprising:

knee protecting means, secured to said hollow pipe supporting member at a position to one side of a center of said hollow pipe supporting member by which said steering apparatus is supported, for relieving an impact load applied to knees of a driver when hit by the knees of the driver upon a collision of said automotive vehicle;

a reinforcing pipe member closely fitted in at least a half portion of said hollow pipe supporting member by which said steering apparatus is supported so as to restrict deformation of said hollow pipe supporting member caused by forward swinging movement of said steering apparatus due to a collision of said automotive vehicle; and a reinforcing strut rigidly connecting said supporting member to said floor panel member so as to thrust said supporting member downward for restricting deformation of said supporting member caused through said knee protecting means when said knee protecting means is hit by the knees of the driver.

* * * * *